Jan. 5, 1926.
N. GRIBOJEDOFF
1,568,378
INTERNAL COMBUSTION ENGINE
Filed Feb. 4, 1925   4 Sheets-Sheet 2
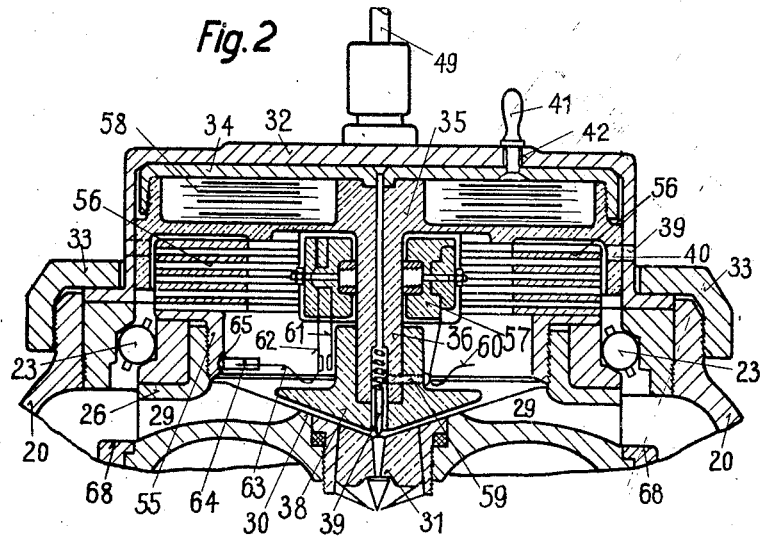
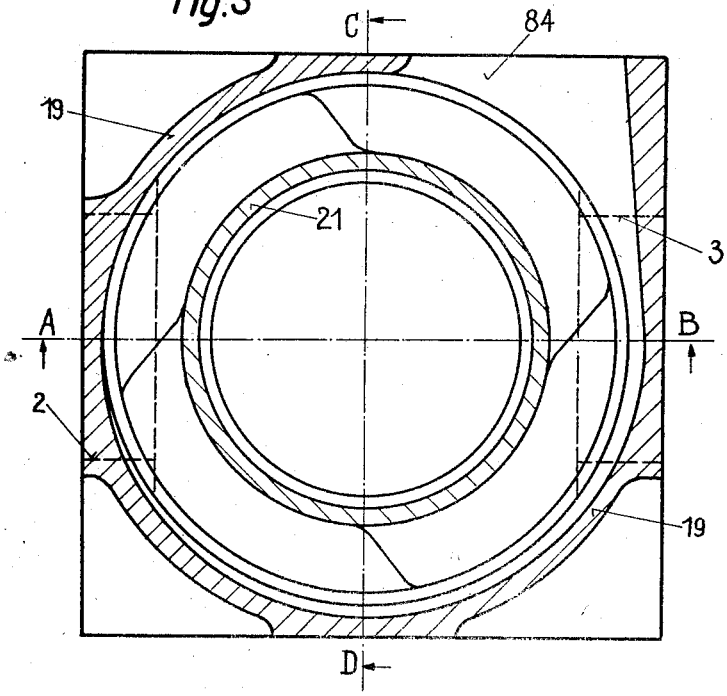
Inventor:
Nicolai Gribojedoff Jan. 5, 1926. 1,568,378
N. GRIBOJEDOFF
INTERNAL COMBUSTION ENGINE
Filed Feb. 4, 1925 4 Sheets-Sheet 3

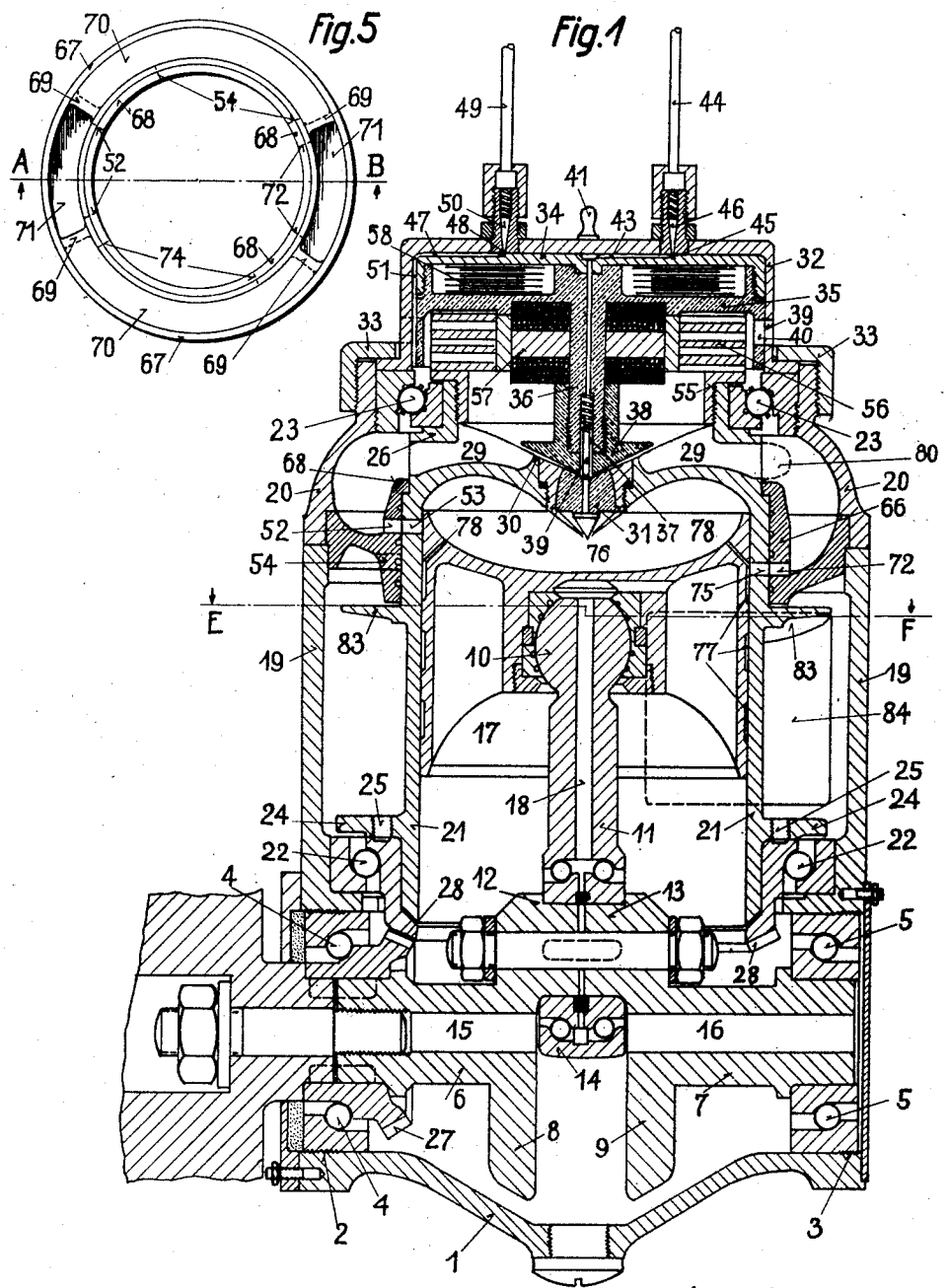

Inventor:
Nicolai Gribojedoff

Jan. 5, 1926.  
N. GRIBOJEDOFF  
1,568,378  
INTERNAL COMBUSTION ENGINE  
Filed Feb. 4, 1925  4 Sheets-Sheet 4
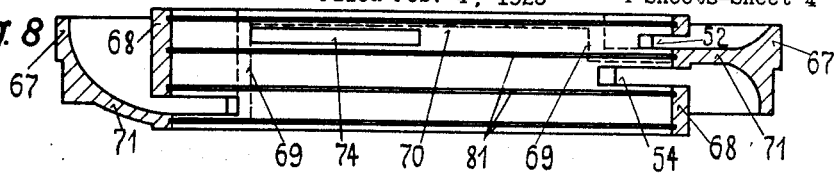
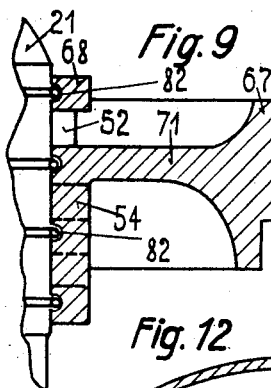
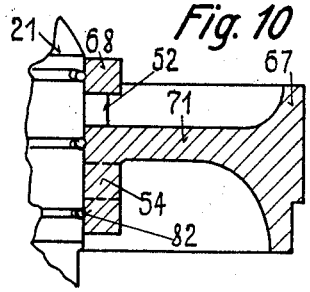
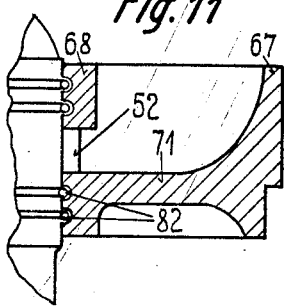
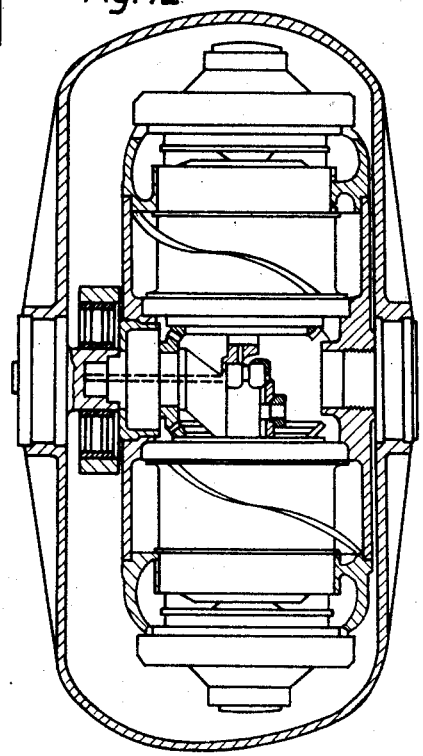
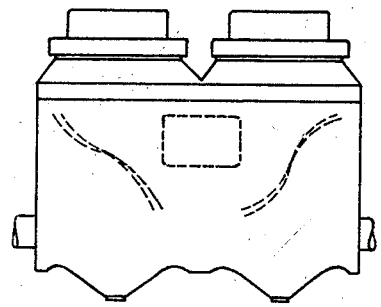
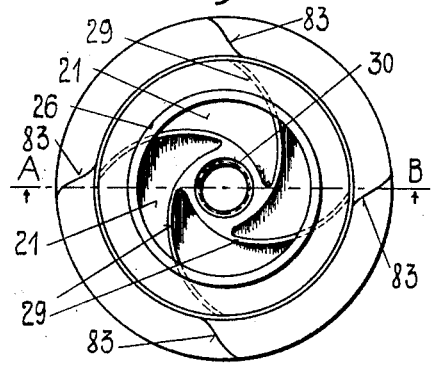
Inventor:  
Nicolai Gribojedoff Patented Jan. 5, 1926.

1,568,378

UNITED STATES PATENT OFFICE.

NICOLAI GRIBOJEDOFF, OF RASETATT, GERMANY.

INTERNAL-COMBUSTION ENGINE.

Application filed February 4, 1925. Serial No. 6,886.

*To all whom it may concern:*

Be it known that I, NICOLAI GRIBOJEDOFF, a citizen of Germany, and resident of Rastatt i/B., Germany, have invented certain new and useful Improvements in Internal-Combustion Engines, of which the following is a specification.

This invention relates to internal combustion engines having a rotary cylinder, and has for its object to provide a simple, economical and effective motor in which the cylinder is formed and arranged so as to comprise a suction-pump, a carburettor, a magneto ignition, an exhaust tank and a radiator whereby a very compact and reliable construction is attained.

In the drawings—

Fig. 1 represents a longitudinal sectional view of a motor embodying the features of the invention, the section being indicated by line A—B of Figures 3, 5 and 14.

Fig. 2 shows a similar sectional view of the upper portion of the motor at a right angle to the section represented in Fig. 1, the section being indicated by line C—D of Figure 3.

Fig. 3 is a cross-sectional view of the cylinder only, the section being indicated by line E—F of Figure 1.

Fig. 5 is a detailed plan view of a distributor governor.

Figs. 6–11 represent in detail sectional views of different constructions of the distributor governor with admission and exhaust ports.

Fig. 12 shows a sectional view of a two-cylinder motor having opposed cylinders, and Fig. 13 a face view of a twin-cylinder motor.

Fig. 14 is a detailed plan view of the cylinder.

Figure 4:
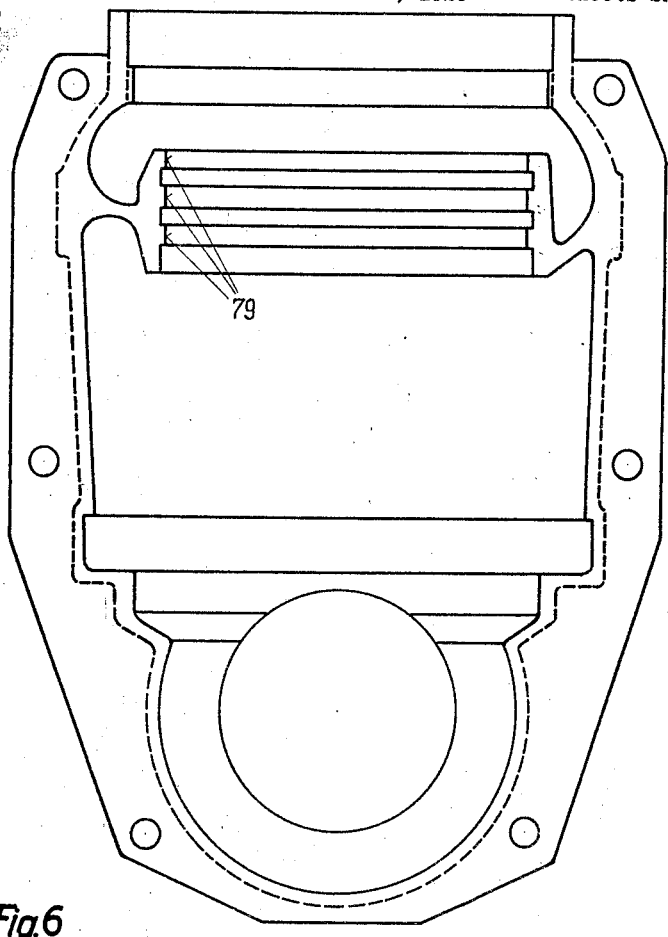
Fig. 4 shows one half of a modified construction of the motor casing, as manufactured by the press.

As shown in Figures 1 and 4, the lower portion of the motor casing 1 is formed so as to correspond with the shape of a crank shaft enclosed therein, and is provided at both sides with openings 2, 3 for receiving ball bearings 4, 5 in which the divided crank shaft 6, 7 is journaled. Both portions 6, 7 of the crank shaft are provided with wings 8, 9 for facilitating the cooling and splash lubrication of a ball and socket joint 10 of a piston rod 11. The pins 12, 13 of the divided crank shaft 6, 7 are journaled in a ball bearing 14 of the piston rod 11.

Both halves of the crank shaft 6, 7 are hollow, as at 15 and 16 for facilitating centering and mounting of the shaft halves 6, 7. The piston rod 11 is connected with the piston 17 by means of a ball and socket joint 10, and provided with a passage 18 for lubricating and ventilating purposes.

The motor casing 1 extends upwardly in the form of a cylindrical portion 19 having a head 20 in which a rotary cylinder 21 for the piston 17 is mounted by means of two ball bearings 22, 23 of a special type forming the subject matter of another application of the inventor. The outer shells of the ball bearings 22, 23 are secured in the cylindrical portion 19 and the head 20 of the motor casing, respectively, whereas the inner shell of the lower ball bearing 22 is secured to a flange 24 of the rotary cylinder 21 by means of screws 25, and the inner shell of the upper ball bearing 23 is rigidly connected with a ring 26 on the head of the cylinder 21 the provision of which will be explained afterwards. As the special ball bearings do not require an exact fitting on the cylinder and in the casing, when cold, and may be operated with a higher temperature than those heretofore known, they do not interfere with the reliable operation of the motor.

On the outer end of the crank shaft portion 6 is mounted a bevel gear wheel 27 which meshes with another bevel gear wheel 28 secured on the lower portion of the cylinder 21. As shown in Fig. 1, the bevel gear 27 is integral with the inner shell of the ball bearing 4 and the bevel gear 28 integral with the inner shell of the ball bearing 22.

On the head of the cylinder 21 are provided ribs 29 of spiral form, as shown in Figs. 1 and 14, on which the ring 26 is rigidly mounted and serving as a seating for the inner shell of the ball bearing 23 rigidly connected therewith. The centre of the cylinder head is provided with a collar 30 in which is inserted a sparking plug 31. The upper portion of the sparking plug 31 is formed as a hollow cone the sides of which are curved preferably in the form of a spiral. On the upper portion of the casing head 20 is secured a cab 32 by means of a cab nut 33. In the cab 32 is inserted a supporting plate 34 in which is screwed a body 35 of insulating material. The body 35 is centrally provided with a protruding portion 36 having an axial bore 37. On the protruding portion 36 is screwed a conical carburettor head 38 so as to be opposite to the hollow cone of the sparking plug 31. In the bore 37 is inserted a spring actuated needle 39 the lower point of which is contacting with the sparking plug 31 in order to supplying current to same. In the cab 32 and the body 35 of insulating material are provided openings 39, 40, respectively. The supporting plate 34 for the body 35 is fitted with a handle 41 passing through a circular slot 42 in the cab 32 (Figs. 1 and 2). By means of this handle 41 the supporting plate 34 as well as the body 35 of insulating material secured therein may be rotated so as to bring the holes 39, 40 into a more or less coinciding position. By this arrangement the air supply to the motor is controlled. The same means serve for controlling the fuel supply, as well as the supply of a lubricating medium. For this purpose the central bore 37 in the body 35 is communicating with a channel 43 which is connected with the fuel supply 44 by means of a circular passage 45. The circular passage 45 has a sloping basis which is co-operating with a spring actuated needle 46 in the fuel supply 44. If the supporting plate 34 is turned by means of the handle 41 the point of the needle 46 will slide on the sloping basis of the circular passage 45 whereby the needle 46 is more or less moved upwards against the action of its spring. In Fig. 1 the needle 46 is shown in its lowest position, in which it will close the fuel supply 44.

A similar arrangement is provided for the lubrication of the motor. In the supporting plate 34 is disposed another channel 47 which by means of a circular channel 48 is communicating with the oil supply 49. In the oil supply 49 is provided another spring actuated needle 50 cooperating with the sloping basis of the circular channel 48 in a similar manner as described with reference to the fuel supply. The channel 47 is communicating with a passage 51 leading to the upper ball bearing 23.

The liquid lubricant discharged from the ball bearing 23 passes during the starting time of the motor through openings 52 and 53 to the interior of the cylinder 17. At the exhaust the excess of lubricant is expelled by the ports 53, 54 into the outer casing 19 whereby the lower ball bearings 22, 4 and 5 as well as the bevel gear 27, 28 are lubricated. The waste of the lubricant is collected in the pit 1 of the casing 19.

Into the ring 26 is screwed another ring 55 for supporting an annular field magnet 56 having one or more pairs of poles. On the central portion 36 of the body 35 is mounted an armature 57 with which is electrically connected a condenser 58. The electrical connection between the armature 57 and the needle 39 for supplying current to the sparking plug 31 is effected by means of a contact screw 59 (see Figure 2) and a contacting spring 60.

The contact breaker consists of two contact springs 61, 62 mounted in an insulating portion of the armature 57. The contact 62 is provided with an arm 63 having a finger 64 which, in operation, is usually sliding on the ring 55, whereas, when ignition is required, is moving outwardly into a recess 65 of the ring 55 (see Figure 2).

Figure 6:
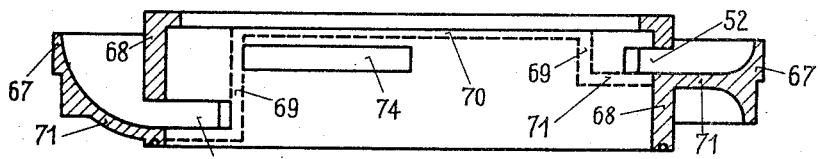

In the head 20 of the motor casing is secured a special distributing governor 66 (see Figs. 1, 5, 6, 7, 8) consisting of two rings 67, 68 which are connected by vertical ribs 69 and horizontal walls 70, 71 provided in different levels between said ribs 69, as will be best seen from Figures 5, 6 and 8. In the inner ring 68 of this distributing governor are provided admission ports 52, 72 which are situated in a level above the walls 71 and exhaust ports 54, 74 which are situated in a level below the walls 70. In the cylinder 21 corresponding ports 53, 75 are provided which during the operation of the motor will at one time coincide with the admission ports 52, 72 and at other times with the exhausts 54, 74. Therefore, the mixture will be admitted into the combustion chamber 76 of the cylinder 21 through the openings 52, 53 and 72, 75, respectively and exhausted therefrom by the openings 53, 54 and 75, 74, respectively.

The outer surface of the piston 17 has no packing rings but is only provided with grooves 77 forming a so-called labyrinth-packing. With a view to improving this packing the grooves 77 are connected with the combustion chamber 76 by means of channels 78.

The admission and exhaust ports are distributed in the walls of the cylinder 21 as well as in the distributing governor so as to comply with the requirements of a two-stroke or four-stroke cycle operation in combination with the number of revolutions of the crank shaft or the number of rotations of the cylinder. By providing said ports in different levels of the cylinder it is unnecessary to unduly weaken the cylinder even if the ports have a comparatively large area. Another advantage of such arrangement is that by the oscillating movement of the piston in combination with the rotary cylinder and the admission and exhaust ports of the distributing ring in different levels a more smooth control of the whole motor is attained.

Figure 7:
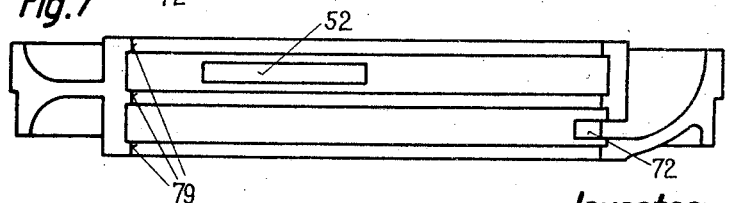

As shown in Figures 4 and 7 the distributing ring might be provided with annular tongues 79 which are co-operating with corresponding grooves in the walls of the cylinder 21. In the constructional form as shown in Figures 4 and 7 the casing of the motor is divided according to a vertical plane going through the centre. This construction is especially adapted in those cases in which the spiral ribs 29 provided on the head of the cylinder 21 are extended as shown in dotted lines at 80 in Figure 1.

With the construction of the distributing governor represented in Figure 6 the only packing means is constituted by the lubricating medium moving in spiral turns between the ring 68 and the rotary cylinder 21. In order to improve this construction the ring 68 might be provided with grooves 81 which are provided between the different levels of the admission and exhaust ports. In these grooves 81 the lubricant will collect in operation thus improving the packing and lubrication at this position.

This packing arrangement as shown in Figure 8 might be still improved by providing special elastic packing rings 82 like the well known piston rings, as shown in Figures 9, 10 and 11.

In order to have the exhaust gases quickly expelled from the motor the outer surface of the cylinder is provided with ribs 83 (Figures 1 and 14) which extend from a level just below the distributing governor to the lower flanges 24. Therefore, in operation these spiral ribs are working like a fan and will produce a certain vacuum in the space between the cylinder 21 and the motor casing 19 whereas the exhaust of the gases is considerably accelerated. With a view to enhancing the action of said ribs 83 the casing 19 has a shape in cross section like a spiral curve, the exhaust 84 being tangentially arranged with reference to the spiral curve. By these means the exhaust is effected in a similar way as if there would be provided a special exhaust blower.

The construction shown and explained has the advantage that the exhaust gases are quickly expanded and therefore their temperature considerably reduced. Therefore the exhaust gases do not heat the cylinder anyway, but are cooling it. It will be apparent that the head of the cylinder is also suitably cooled by the evaporating action of the carburettor. This cooling action on the head of the cylinder will of course be also imparted to its walls as the spiral ribs 83 are permanently acting during all cycles of the motor. The exhaust suction is considerably increased and the noise of the explosions correspondingly decreased so that a special exhaust tank is dispensed with. Therefore, the provision of a simple exhaust pipe only will be necessary.

As will be apparent from Figures 1 and 3 the lower diameter of the casing 19 as well as the diameters of the openings 2 and 3 will allow that the crank shaft 6, 7 with the piston rod 11 and piston 17 completely mounted thereon might be inserted into the casing 19. Thereafter, the ball bearings 4, 5 might be put into position and then the cylinder with the distributing governor inserted into the casing.

The construction shown in Figures 4 and 7 has the advantage that the ribs 29 secured on the cylinder head might be provided with extensions 80 (as shown in Figure 1) as the casing of the motor is divided in a vertical plane. The employment of extended ribs 29 on the head of the cylinder 21 is especially adapted in such cases in which it is desired to use heavy oils as fuel. If such heavy oils are employed as fuel the evaporating action of the carburettor is considerably enhanced by the use of extended ribs as above referred to.

The invention is also adapted to be employed in a construction of a twin-cylinder arrangement as shown in Figure 13 or in a construction having two cylinders opposed as represented in Figure 12. With such constructions as shown in Figures 12 and 13 the ignition might be simplified by providing only a magneto ignition for both cylinders. In this case the armature might be mounted on the stationary bearing for the crank shaft whereas the field magnet will be rotated by the cylinders, the current being supplied to the cylinders by known contact makers.

While I have shown and described certain details of construction for carrying out my invention, it should be understood that I may vary such details within the scope of so-called mechanics.

I claim:—

1. In an internal combustion engine, the combination of a stationary cylindrical casing, a rotary cylinder coaxially mounted in said casing, a reciprocating piston mounted in said cylinder, a crank shaft journaled in said casing, a rod connecting said crank shaft with said piston, bevel gear wheels mounted on said crank shaft or on said cylinder respectively and meshing with each other, a casing head mounted on said casing, a cylinder head closing the upper end of said cylinder, an annular field magnet supported by said cylinder head, and an armature supported by said casing head and coaxially disposed in said field magnet, said field magnet and said armature being centrally arranged with respect to said casing and said cylinder.

2. In an internal combustion engine, the combination of a stationary cylindrical casing, a rotary cylinder coaxially mounted in said casing, a reciprocating piston mounted in said cylinder, a crank shaft journaled in said casing, a rod connecting said crank shaft with said piston, bevel gear wheels mounted on said crank shaft or on said cylinder respectively and meshing with each other, a casing head mounted on said casing, a cylinder head closing the upper end of said cylinder, an annular field magnet supported by said cylinder head, a sparking plug also supported by said cylinder head and having a conical concavity in its upper face, an armature supported by said casing head and coaxially disposed in said field magnet, and a conical carburetter head also supported by said casing head and engaging said concavity, said field magnet, sparking plug, armature and carburetter head being centrally arranged with respect to said casing and said cylinder.

3. In an internal combustion engine, the combination of a stationary cylindrical casing, a rotary cylinder coaxially mounted in said casing, a reciprocating piston mounted in said cylinder, a crank shaft journaled in said casing, a rod connecting said crank shaft with said piston, bevel gear wheels mounted on said shaft or on said cylinder respectively and meshing with each other, a casing head mounted on said casing, a cylinder head closing the upper end of said cylinder, an annular field magnet supported by said cylinder head, a closing cab secured on said casing head, an insulating body inserted in said cab, a projection centrally provided on said body, an armature mounted on said projection and coaxially disposed in said field magnet, said field magnet and said armature being centrally arranged with respect to said casing and said cylinder.

4. In an internal combustion engine, the combination of a stationary cylindrical casing, a rotary cylinder coaxially mounted in said casing, a reciprocating piston mounted in said cylinder, a crank shaft journaled in said casing, a rod connecting said crank shaft with said piston, bevel wheels mounted on said crank shaft or on said cylinder respectively and meshing with each other, a casing head mounted on said casing, a cylinder head closing the upper end of said cylinder, an annular field magnet supported by said cylinder head, a sparking plug also supported by said cylinder head and having a conical concavity in its upper face, a closing cab secured on said casing head, an insulating body inserted in said cab, a projection centrally provided on said body, an armature mounted on said projection and coaxially disposed in said field magnet, and a conical carburetter head also mounted on said projection and engaging said concavity, said field magnet, sparking plug, armature and carburetter head being centrally arranged with respect to said casing and said cylinder.

5. In an internal combustion engine, the combination of a stationary cylindrical casing, a rotary cylinder coaxially mounted in said casing, a reciprocating piston mounted in said cylinder, a crank shaft journaled in said casing, a rod connecting said crank shaft with said piston, bevel wheels mounted on said crank shaft or on said cylinder respectively and meshing with each other, a casing head mounted on said casing, a cylinder head closing the upper end of said cylinder, a carburetter comprising two parts supported by said casing head or said cylinder head respectively, and atomizing ribs provided on said cylinder head, said carburetter being centrally arranged with respect to said casing and said cylinder, and said ribs extending from said carburetter to the periphery of said cylinder head.

6. In an internal combustion engine, the combination of a stationary cylindrical casing, a rotary cylinder coaxially mounted in said casing, a reciprocating piston mounted in said cylinder, a crank shaft journaled in said casing, a rod connecting said crank shaft with said piston, bevel gear wheels mounted on said shaft or on said cylinder respectively and meshing with each other, a casing head mounted on said casing, a cylinder head closing the upper end of said cylinder, an annular field magnet supported by said cylinder head, a closing cab secured on said casing head, an insulating body rotatably mounted in said cab, an armature supported by said body and coaxially disposed in said field magnet, air admission openings provided in the walls of said cab and said body, and means for rotating said body, said field magnet and said armature being centrally arranged with respect to said casing and said cylinder.

7. In an internal combustion engine, the combination of a stationary cylindrical casing, a rotary cylinder coaxially mounted in said casing, a reciprocating piston mounted in said cylinder, a crank shaft journaled in said casing, a rod connecting said crank shaft with said piston, bevel gear wheels mounted on said shaft or said cylinder respectively and meshing with each other, a casing head mounted on said casing, a cylinder head closing the upper end of said cylinder, an annular field magnet supported by said cylinder head, an armature supported by said casing head and coaxially disposed in said field magnet, and a carburetter comprising two parts supported by said casing head or said cylinder head respectively, said field magnet, armature and carburetter being centrally arranged with respect to said casing and said cylinder.

8. In an internal combustion engine, the combination of a stationary cylindrical casing, a rotary cylinder coaxially mounted in said casing, a reciprocating piston mounted in said cylinder, a crank shaft journaled in said casing, a rod connecting said crank shaft with said piston, bevel wheels mounted on said shaft or said cylinder respectively and meshing with each other, a casing head mounted on said casing, a cylinder head closing the upper end of said cylinder, an annular field magnet supported by said cylinder head, an armature supported by said casing head and coaxially disposed in said field magnet, a carburettor comprising two parts supported by said casing head or said cylinder head respectively, and atomizing ribs provided on said cylinder head, said field magnet, armature an carburettor being centrally arranged with respect to said casing and said cylinder, and said ribs extending from said carburettor to the periphery of said cylinder head.

9. In an internal combustion engine, the combination of a stationary cylindrical casing, a rotary cylinder coaxially mounted in said casing, a reciprocating piston mounted in said cylinder, a crank shaft journaled in said casing, a rod connecting said crank shaft with said piston, bevel gear wheels mounted on said shaft or said cylinder respectively and meshing with each other, a casing head mounted on said casing, a cylinder head closing the upper end of said cylinder, an annular field magnet supported by said cylinder head, a closing cab secured on said casing head, an insulating body rotatably mounted in said cab, an armature supported by said body and coaxially disposed in said field magnet, air admisssion openings provided in the walls of said cab and said body, means for rotating said body, and a carburettor comprising two parts supported by said casing head or said cylinder head respectively, said field magnet, armature and carburettor being centrally arranged with respect to said casing and said cylinder.

10. In an internal combustion engine, the combination of a stationary cylindrical casing, a rotary cylinder coaxially mounted in said casing, a reciprocating piston mounted in said cylinder, a crank shaft journaled in said casing, a rod connecting said crank shaft with said piston, bevel gear wheels mounted on said shaft or said cylinder respectively and meshing with each other, a casing head mounted on said casing, a cylinder head closing the upper end of said cylinder, an annular field magnet supported by said cylinder head, a closing cab secured on said casing head, an insulating body rotatably mounted in said cab, an armature supported by said body and coaxially disposed in said field magnet, air admission openings provided in the walls of said cab and said body, means for rotating said body, a carburettor comprising two parts supported by said casing head or said cylinder head respectively, and atomizing ribs provided on said cylinder head, said field magnet, armature and carburettor being centrally arranged with respect to said casing and eaid cylinder, and said ribs extending from said carburettor to the periphery of said cylinder head.

In testimony whereof I hereunto affix my signature.

NICOLAI GRIBOJEDOFF.